US012416322B2

(12) United States Patent
Watson et al.

(10) Patent No.: US 12,416,322 B2
(45) Date of Patent: Sep. 16, 2025

(54) DRAG REDUCING AGENTS AND METHODS OF USING THEREOF

(71) Applicant: Ohio State Innovation Foundation, Columbus, OH (US)

(72) Inventors: Lucas Watson, Tucker, GA (US); Andrew Maxson, Dublin, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 396 days.

(21) Appl. No.: 16/810,806

(22) Filed: Mar. 5, 2020

(65) Prior Publication Data

US 2020/0284277 A1 Sep. 10, 2020

Related U.S. Application Data

(60) Provisional application No. 62/813,983, filed on Mar. 5, 2019.

(51) Int. Cl.

*F15D 1/06* (2006.01)
*C11D 1/62* (2006.01)
*C11D 3/20* (2006.01)
*F28F 13/02* (2006.01)

(52) U.S. Cl.

CPC .................. *F15D 1/06* (2013.01); *C11D 1/62* (2013.01); *C11D 3/2075* (2013.01); *F28F 13/02* (2013.01)

(58) Field of Classification Search

None

See application file for complete search history.

(56) References Cited

U.S. PATENT DOCUMENTS

| | | | | |
|---|---|---|---|---|
| 5,902,784 | A | 5/1999 | Hellsten et al. | |
| 2007/0290160 | A1* | 12/2007 | Koyanagi | C04B 40/0042 252/1 |
| 2008/0078814 | A1* | 4/2008 | Koyanagi | C04B 40/0039 228/101 |

OTHER PUBLICATIONS

Cates, M. E., and Michael S. Turner. "Flow-induced gelation of rodlike micelles." EPL (Europhysics Letters) 11.7 (1990): 681.

Chang, R. C., and J. L. Zakin. "Drag reduction of non-ionic surfactant mixtures." The Influence of Polymer Additives on Velocity and Temperature Fields. Springer, Berlin, Heidelberg, 1985. 61-70.

Christov, N. C., et al. "Synergistic sphere-to-rod micelle transition in mixed solutions of sodium dodecyl sulfate and cocoamidopropyl betaine." Langmuir 20.3 (2004): 565-571.

Chu, Zonglin, and Yujun Feng. "pH-switchable wormlike micelles." Chemical communications 46.47 (2010): 9028-9030.

Dai, Caili, et al. "The role of hydroxyethyl groups in the construction of wormlike micelles in the system of quaternary ammonium surfactant and sodium salicylate." Soft Matter 11.39 (2015): 7817-7826.

Dorothy Saul, Gordon J. T. Tiddy, Barbara A. Wheeler, Phillip A. Wheeler, and Edwin Willis. Phase Structure and rheological properties of a mixed zwitterionic/ anionic surfactant system. Journal of the Chemical Society, Faraday Transactions 1: Physical Chemistry in Con-densed Phases, 70(0):163, 1974.

(Continued)

*Primary Examiner* — Vishal V Vasisth

(74) *Attorney, Agent, or Firm* — Meunier Carlin & Curfman LLC

(57) ABSTRACT

Disclosed are compounds that exhibit switchable turbulent drag reduction as well as aqueous compositions comprising these compounds. Also disclosed are methods of using these compounds and compositions as drag reducers.

14 Claims, 3 Drawing Sheets

(56) References Cited

OTHER PUBLICATIONS

Hassan, P. A., et al. "Vesicle to micelle transition: rheological investigations." Langmuir 12.18 (1996): 4350-4357.
Hoffmann, H., et al. "Shear-induced transitions in micellar solutions." Trends in Colloid and Interface Science V. Steinkopff, Heidelberg, 1991. 24-35.
John F. Sramehorn. Precipitation of mixtures of anionic surfactants. In Mixed Smjactant Systems, pp. 392-401. American Chemical Society, 1992.
Kato, Tadashi, Hidetomo Takeuchi, and Tsutomu Seimiya. "Change in size and composition of mixed micelles with concentration in anionic/cationic surfactant solutions." Journal of colloid and interface science 140.1 (1990): 253-257.
Kumar, Rakesh, et al. "Wormlike micelles of a C22-tailed zwitterionic betaine surfactant: from viscoelastic solutions to elastic gels." Langmuir 23.26 (2007): 12849-12856.
Lehnberger, Christoph, and Thomas Wolff. "Photorheological effects in aqueous micellar tetramethylammoniumhydrogen-2-dodecyl malonate via photodimerization of acridizinium bromide." Journal of colloid and interface science 213.1 (1999): 187-192.
Li, Pei-Wen, Yasuo Kawaguchi, and Akira Yabe. "Transitional heat transfer and turbulent characteristics of drag-reducing flow through a contracted channel." Journal of Enhanced Heat Transfer 8.1 (2001) Abstract.
Lin, Yiyang, et al. "A facile route to design pH-responsive viscoelastic wormlike micelles: smart use of hydrotropes." Journal of colloid and interface science 330.2 (2009): 449-455.
Lin, Zhiqing, et al. "Comparison of drag reduction, rheology, microstructure and stress-induced precipitation of dilute cationic surfactant solutions with odd and even alkyl chains." Rheologica acta 41.6 (2002): 483-492.
Lu, B., et al. "Effect of chemical structure on viscoelasticity and extensional viscosity of drag-reducing cationic surfactant solutions." Langmuir 14.1 (1998): 8-16.
Maeda, Hiroshi, et al. "Reversible Micelle-Vesicle Conversion of Oleyldimethylamine Oxide by pH Changes." The Journal of Physical Chemistry B 110.25 (2006): 12451-12458.
Mary, Pascaline, et al. "Reconciling low-and high-salt solution behavior of sulfobetaine polyzwitterions." The Journal of Physical Chemistry B 111.27 (2007): 7767-7777.
Mixed surfactant systems. In Surface Chemistry of Surfactants and Polymers, pp. 251-269. John Wiley & Sons, Ltd, Sep. 2014.
Ohlendorf, D., W. Interthal, and H. Hoffmann. "Surfactant systems for drag reduction: physico-chemical properties and rheological behaviour." Rheologica Acta 25.5 (1986): 468-486.
Paul M. Holland. Modeling mixed surfactant systems. In Mixed Surfact anl Syslerns, pp. 31-44. American Chemical Society, 1992.
Qi, Yunying, et al. "Enhanced heat transfer of drag reducing surfactant solutions with fluted tube-in-tube heat exchanger." International Journal of Heat and Mass Transfer 44.8 (2001): 1495-1505.
Qi, Yunying, et al. "Enhancing heat transfer ability of drag reducing surfactant solutions with static mixers and honeycombs." International Journal of Heat and Mass Transfer 46.26 (2003): 5161-5173.
Qi, Yunying, Linda K. Weavers, and Jacques L. Zakin. "Enhancing heat-transfer ability of drag reducing surfactant solutions with ultrasonic energy." Journal of non-newtonian fluid mechanics 116.1 (2003): 71-93.
Salkar, R. A., et al. "A thermally reversible vesicle to micelle transition driven by a surface solid-fluid transition." Chemical Communications 10 (1996): 1223-1224.
Savins, Joseph G. "A stress-controlled drag-reduction phenomenon." Rheologica Acta 6.4 (1967): 323-330.
Shi, Haifeng, et al. "A drag reducing surfactant threadlike micelle system with unusual rheological responses to pH." Journal of colloid and interface science 418 (2014): 95-102.
Shi, Haifeng, et al. "Enhancing heat transfer of drag-reducing surfactant solution by an HEV static mixer with low pressure drop." Advances in Mechanical Engineering 3 (2011): 315943.
Shi, Haifeng, et al. "Photoreversible micellar solution as a smart drag-reducing fluid for use in district heating/cooling systems." Langmuir 29.1 (2013): 102-109.
Sletfjerding, et al., Boosting the heating capacity of oil-production bundles using drag-reducing surfactants. In International Symposium on Oilfield Chemistry. Society of Petroleum Engineers (SPE), 2003.
Song, Binglei, Yufang Hu, and Jianxi Zhao. "A single-component photo-responsive fluid based on a gemini surfactant with an azobenzene spacer." Journal of colloid and interface science 333.2 (2009): 820-822.
Stellner, Kevin L., and John F. Scamehorn. "Hardness tolerance of anionic surfactant solutions. 1. Anionic surfactant with added monovalent electrolyte." Langmuir 5.1 (1989): 70-77.
Su, Xin, Michael F. Cunningham, and Philip G. Jessop. "Switchable viscosity triggered by CO2 using smart worm-like micelles." (2013). Chemical communications 2013 v.49 No. 26 pp. 2655-2657.
Tsuchiya, Koji, et al. "Control of viscoelasticity using redox reaction." Journal of the American Chemical Society 126.39 (2004): 12282-12283.
Verma, Gunjan, Vinod Kumar Aswal, and Puthusserickal Hassan. "pH-responsive self-assembly in an aqueous mixture of surfactant and hydrophobic amino acid mimic." Soft Matter 5.15 (2009): 2919-2927.
Wolff, Thomas, and Günther von Bünau. "Light Induced Viscosity Changes and Phase Transitions in Aqueous CTAB-Solutions Containing Aromatic Molecules." Berichte der Bunsengesellschaft für physikalische Chemie 88.11 (1984): 1098-1101.
Wydro, Paweł, and Maria Paluch. "A study of the interaction of dodecyl sulfobetaine with cationic and anionic surfactant in mixed micelles and monolayers at the air/water interface." Journal of colloid and interface science 286.1 (2005): 387-391.
Yongmin Zhang, Zonglin Chu, Cecile A. Dreiss, Yuejiao Wang, Chen-hong Fei. and Yujun Feng. Smart wormlike micelles switched by CO2 and air. Soft Matter, 9(27):6217, 2013.
Zakin, J. L., and J. L. Chiang. "Non-ionic surfactants as drag reducing additives." Nature Physical Science 239.89 (1972): 26-28.
Zhang, Yongmin, et al. "CO2-switchable viscoelastic fluids based on a pseudogemini surfactant." Langmuir 29.13 (2013): 4187-4192.
Zhao, Guo-Xi, and Jin-Xin Xiao. "Aqueous two-phase systems of the aqueous mixtures of cationic-anionic surfactants." Journal of colloid and interface science 177.2 (1996): 513-518.
Zhu, Bu Yao, and Milton J. Rosen. "Synergism in binary mixtures of surfactants: IV. Effectiveness of surface tension reduction." Journal of colloid and interface science 99.2 (1984): 435-442.

* cited by examiner

DRAG REDUCING AGENTS AND METHODS OF USING THEREOF

CROSS-REFERENCE TO RELATED APPLICATIONS

This application claims benefit of U.S. Provisional Application No. 62/813,983, filed Mar. 5, 2019, each of which is hereby incorporated herein by reference in its entirety.

TECHNICAL FIELD

This application relates generally to the field of fluid dynamics and, more particularly, to improved methods and compositions useful in reducing the frictional resistance encountered in the flow of liquids (e.g., aqueous liquids).

BACKGROUND

Various additives have the capability of reducing the extent of pressure drop resulting from energy consumed through friction between a flowing liquid and a surface, such as the inside wall of a pipe, along which the liquid is flowing.

High polymer solutes, soap solutes and suspended fibrous solids have all demonstrated the ability to reduce friction or drag in turbulent flow of aqueous liquids. High polymer additives are of limited utility, however, since they are subject to irreversible mechanical degradation in regions of high shear such as in pumps or in flow through narrow clearances. The low molecular weight degradation products are much less effective drag reducers. A further practical impediment to the use of polymer additives is presented by the very slow rates at which such additives dissolve. Weeks or even months may be required for dissolution to be completed.

Soap additives do not suffer the disadvantage of irreversible mechanical shear degradation. Mechanical degradation is observed in such systems, but is reversible, and full drag reduction ability is regained once the solution is removed from a high stress region. Soap additives, however, do suffer from other drawbacks. Thus, metallic soaps of fatty acids are limited in their application because calcium and other cations normally present in tap water or sea water cause precipitation of insoluble soaps. Another soap additive, which is reportedly effective as a drag reducer, is a complex soap containing equimolor amounts of cetyltrimethylammonium bromide and 1-naphthol. This soap does not precipitate in the presence of calcium ions, but its components are expensive and degrade chemically in aqueous solutions in the course of a few days.

Achievement of effective drag reduction with solid suspension of fibers requires high concentrations of solids with attendant settling and plugging problems. The drawbacks of a solid suspension system would be particularly severe in a long pipeline, especially one which traverses a remote area. Also, of course, the suspended solid must be separated from the liquid at its destination and the separation would require additional equipment with potential operational problems and yield losses.

An unfulfilled need, therefore, exists for improved methods and compositions for reducing frictional resistance to flow in pipelines and along other surfaces.

SUMMARY

Provided herein are drag reducing agents. The drag reducing agents can comprise a cationic surfactant and an aromatic counterion. The cationic surfactant can be defined by the formula below $Z—R^1$ wherein Z represents a positively charged headgroup chosen from a pyridinium headgroup and a quaternary ammonium headgroup; and $R^1$ represents a $C_{12-32}$ alkyl group, a $C_{12-32}$ heteroalkyl group, a $C_{12-32}$ alkenyl group, or a $C_{12-32}$ heteroalkenyl group. The aromatic counterion can be defined by one of Formula IIA-Formula IID below Formula IIA

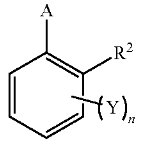

Formula IIB

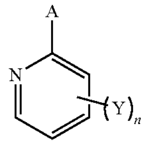

Formula IIC

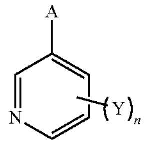

Formula IID

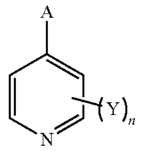

wherein A represents an anionic substituent; $R^2$ represents Y, hydrogen, or hydroxy; Y represents a hydrophobic substituent; and n is 1, 2, 3, or 4.

A represents a substituent which can be negatively charged when the drag reducing agent is present in aqueous solution. In some embodiments, A can comprise a carboxylate group, a sulfate group, a sulfonate group, or a phosphate group. In certain embodiments, the aromatic counterion can comprise a benzoic acid derivative or a pyridinecarboxylic acid derivative (i.e., A can be $—COO^{(-)}$).

In some embodiments, the aromatic counterion is defined by the formula below

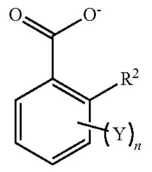

wherein $R^2$ represents Y, hydrogen, or hydroxy; Y represents a hydrophobic substituent; and n is 1, 2, 3, or 4.

n can define the number of Y groups present on the aromatic ring. As shown in the general structures above, they can be present in any position on the ring. In certain embodiments above, n is 1 or 2.

In some embodiments above, Y represents, individually for each occurrence, halogen, $C_{1-4}$ alkyl, $C_{2-4}$ alkenyl, $C_{2-4}$ alkynyl, $C_{1-4}$ haloalkyl, $C_{1-4}$ alkoxy, or $C_{1-4}$ haloalkoxy. In certain embodiments above, Y represents, individually for each occurrence, halogen, $C_{1-4}$ alkyl, or $C_{1-4}$ haloalkyl.

Examples of aromatic counterions comprise, for example, n-chlorobenzoic acids (e.g., 2-chlorobenzoic acid, 3-chlorobenzoic acid, 4-chlorobenzoic acid, or any combination thereof).

The aromatic counterion can be present in an effective amount to decrease the critical micelle concentration of the cationic surfactant by at least 5% (e.g., at least 10%, at least 25%, at least 50%, at least 75%, at least 100%, or more). In some embodiments, the aromatic counterion and the cationic surfactant can be present in a molar ratio (aromatic counterion:cationic surfactant) of from 0.5:1 to 5:1 (e.g., from 0.5:1 to 2:1, from 1.5:1 to 3.5:1, or from 2:1 to 3:1).

In some embodiments, the cationic surfactant can comprise a quaternary ammonium surfactant. For example, in some embodiments, the cationic surfactant can be defined by Formula IA Formula IA

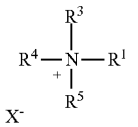

wherein $R^1$ represents a $C_{12-32}$ alkyl group, a $C_{12-32}$ heteroalkyl group, a $C_{12-32}$ alkenyl group, or a $C_{12-32}$ heteroalkenyl group; $R^3$, $R^4$, and $R^5$ each independently represent a $C_{1-12}$ alkyl group, a $C_{1-12}$ heteroalkyl group, a $C_{1-12}$ alkenyl group, or a $C_{1-12}$ heteroalkenyl group; and $X^{(-)}$ represents a monovalent anion, such as $F^{(-)}$, $Cl^{(-)}$, $Br^{(-)}$, $I^{(-)}$, $NO_3^{(-)}$, $SO_3H^{(-)}$, $SO_4H^{(-)}$, $CH_3COO^{(-)}$(acetate), $CH_3SO_3^{(-)}$(methane sulfonate), $CF_3SO_3^{(-)}$ (fluoromethane sulfonate), $CH_3OSO_3^{(-)}$ (methanesulfate), HO—$CH_2COO^{(-)}$ (glycolate), or HO—$CH(CH_3)COO^{(-)}$(lactate). For example, in some cases, the cationic surfactant can comprise cetrimonium chloride, cetrimonium bromide, stearyltrimethylammonium chloride, stearyltrimethylammonium bromide, tallowtrimonium chloride, tallowtrimonium bromide, aurtrimonium chloride, aurtrimonium bromide, cocoyl trimethylammonium chloride, cocoyl trimethylammonium bromide, N,N-Bis(2-hydroxyethyl)-N-methyloctadecanaminium chloride, N,N-Bis(2-hydroxyethyl)-N-methyloctadecanaminium bromide, Methyl bis(2-hydroxyethyl)cocammonium chloride, Methyl bis(2-hydroxyethyl)cocammonium bromide, erucyl bis(2-hydroxyethyl)methyl ammonium chloride, erucyl bis(2-hydroxyethyl)methyl ammonium bromide, or any combination thereof.

In some embodiments, the cationic surfactant can be defined by Formula IB

Formula IB

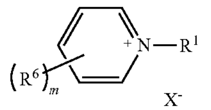

Wherein $R^1$ represents a $C_{12-32}$ alkyl group, a $C_{12-32}$ heteroalkyl group, a $C_{12-32}$ alkenyl group, or a $C_{12-32}$ heteroalkenyl group; $R^6$ represents, individually for each occurrence, $C_{1-4}$ alkyl; m is 0, 1, 2, or 3; and $X^{(-)}$ represents a monovalent anion, such as $F^{(-)}$, $Cl^{(-)}$, $Br^{(-)}$, $I^{(-)}$, $NO_3^{(-)}$, $SO_3H^{(-)}$, $SO_4H^{(-)}$, $CH_3COO^{(-)}$ (acetate), $CH_3SO_3^{(-)}$ (methane sulfonate), $CF_3SO_3^{(-)}$(fluoromethane sulfonate), $CH_3OSO_3^{(-)}$ (methanesulfate), HO—$CH_2COO^{(-)}$ (glycolate), or HO—$CH(CH_3)COO^{(-)}$(lactate). For example, in some cases, the cationic surfactant can comprise cetylpyridinium chloride, cetylpyridinium bromide, or any combination thereof.

Also provided are aqueous composition comprising water and a drag reducing agent described herein.

The drag reducing agent can be present in the aqueous composition in an amount of 5.0% by weight or less (e.g., 1.0% by weight or less, or 0.5% by weight or less), based on the total weight of the aqueous composition. For example, in some embodiments, the drag reducing agent can be present in the aqueous composition in an amount of from 0.001% by weight to 0.1% by weight, or from 0.1% by weight to 2.5% by weight, based on the total weight of the aqueous composition.

In some embodiments, the cationic surfactant and the anionic counterion self-assemble to form thread-like micelles having an aspect ratio of at least 10:1 (e.g., at least 50:1, at least 100:1, at least 250:1, at least 500:1, at least 1,000:1, at least 5,000:1, at least 10,000:1, or more).

In some embodiments, the aqueous composition can further comprise a pH adjusting agent (e.g., an acid, a base, or a combination thereof). In certain embodiments, the composition can have a pH of from 7 to 11, such as a pH of from 7 to 10. In some embodiments, the aqueous composition further comprises one or more additives, such as a biocide, an antifreeze agent, a corrosion inhibitor, an anti-scaling agent, or a combination thereof.

The compositions can exhibit switchable turbulent drag reduction. For example, in some embodiments, the composition can exhibit one or more of the following in response to a change in stimulus, environment, or composition: (a) drag reduction percent, heat transfer reduction percent, or a combination thereof are reduced by at least 10 percentage points by a temperature change of less than or equal to 5° C.; (b) drag reduction percent, heat transfer reduction percent, or a combination thereof are reduced by at least 10 percentage points by a temperature change of less than or equal to 5° C. at temperatures between 0° C. and 20° C.; (c) drag reduction percent, heat transfer reduction percent, or a combination thereof are reduced by at least 10 percentage points by a temperature change of less than or equal to 5° C. at temperatures between 0° C. and 15° C.; (d) drag reduction percent, heat transfer reduction percent, or a combination thereof are reduced by at least 10 percentage points by a temperature change of less than or equal to 5° C. at temperatures between 40° C. and 60° C.; (e) drag reduction percent, heat transfer reduction percent, or a combination thereof are reduced by at least 10 percentage points by a temperature change of less than or equal to 5° C. at temperatures between 40° C. and 70° C.; (f) drag reduction percent, heat transfer reduction percent, or a combination thereof are reduced by at least 10 percentage points by a change in flow rate of less than or equal to 10%; (g) drag reduction percent, heat transfer reduction percent, or a combination thereof are reduced by at least 10 percentage points by a change in flow rate of less than or equal to 20%; (h) drag reduction percent, heat transfer reduction percent, or a combination thereof are reduced by at least 10 percentage points by a change in pipe diameter of less than or equal to 20%; (i) drag reduction percent, heat transfer reduction percent, or a combination thereof are reduced by at least 10 percentage points by a change in pipe diameter of less than or equal to 30%; (j) drag reduction percent, heat transfer reduction percent, or a combination thereof are reduced by at least 10 percentage points by a change in pipe diameter of less than or equal to 40%; (k) drag reduction percent, heat transfer reduction percent, or a combination thereof are reduced by at least 10 percentage points by a change in pipe diameter of less than or equal to 50%; (l) drag reduction percent, heat transfer reduction percent, or a combination thereof are reduced by at least 10 percentage points by a change in concentration of less than or equal to 1%; (m) drag reduction percent, heat transfer reduction percent, or a combination thereof are reduced by at least 10 percentage points by a change in concentration of less than or equal to 10%; (n) drag reduction percent, heat transfer reduction percent, or a combination thereof are reduced by at least 10 percentage points by a change in concentration of less than or equal to 25%; or any combination thereof.

Also provided are methods of reducing the frictional energy losses associated with the flow of an aqueous fluid along a surface (e.g., the interior surface of a pipe or tube). These methods can comprise adding a drag reducing agent described herein to the aqueous fluid. The aqueous fluid can comprise, for example, a heating medium in a heat transport system, a heating medium in a recirculating heat transport system, a heating medium in an HVAC system, a heating medium in a recirculating HVAC system, a cooling medium in a heat transport system, a cooling medium in a recirculating heat transport system, a cooling medium in an HVAC system, a cooling medium in a recirculating HVAC system, an aqueous fluid injected in an oil and gas operation, or any combination thereof.

Additional advantages of the disclosed compositions and methods will be set forth in part in the description which follows, and in part will be obvious from the description. The advantages of the disclosed compositions and methods will be realized and attained by means of the elements and combinations particularly pointed out in the appended claims. It is to be understood that both the foregoing general description and the following detailed description are exemplary and explanatory only and are not restrictive of the disclosed compositions and methods, as claimed.

The details of one of more embodiments of the invention are set forth in the accompanying drawings and description below. Other features, objects, and advantages of the invention will be apparent form the description and drawings, and from the claims.

DETAILED DESCRIPTION

Figure 1:
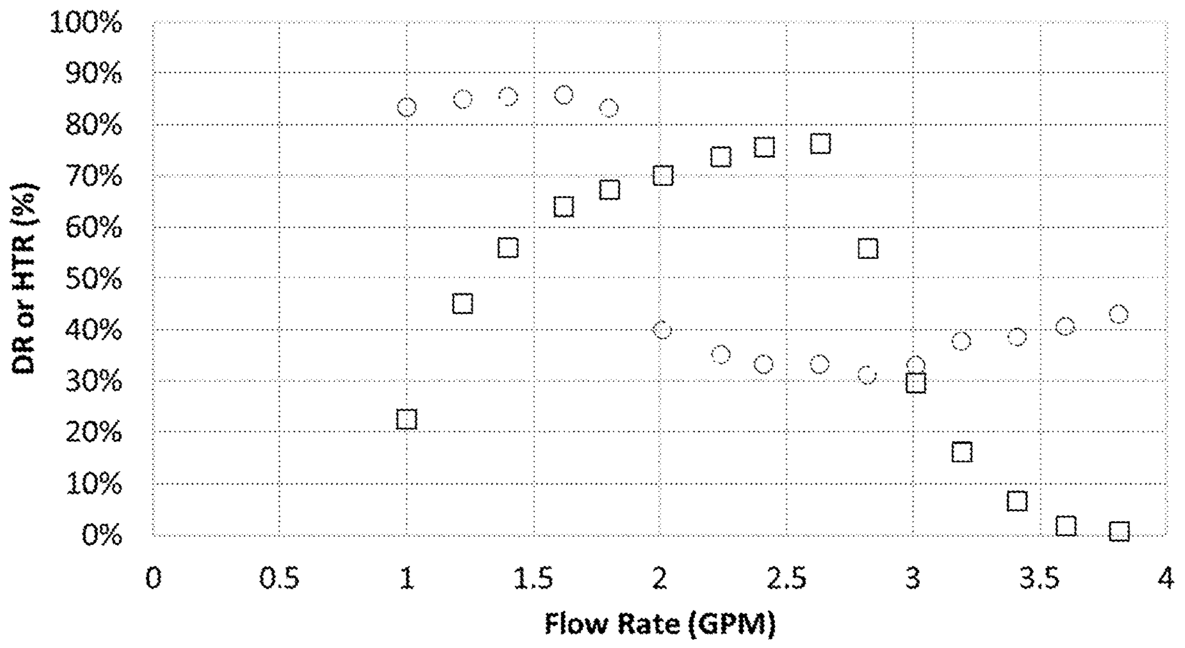
FIG. 1 is a plot showing HTR in 7.75 mm tubing (circles) and DR in 10.2 mm tubing (squares) for 2.5 mM hexadecyltrimethyl ammonium chloride and 2.5 mM 3-chlorobenzoic acid in water at 20.5° C.

The compositions and methods described herein may be understood more readily by reference to the following detailed description of specific aspects of the disclosed subject matter and the Examples included herein.

Definitions

Before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Unless otherwise specified, all percentages are in weight percent and the pressure is in atmospheres.

References in the specification and concluding claims to parts by weight of a particular element or component in a composition denotes the weight relationship between the element or component and any other elements or components in the composition or article for which a part by weight is expressed at room temperature (e.g., ~20° C.) and pressure (1 atm). Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included at room temperature (e.g., ~20° C.) and pressure (1 atm).

At various places in the present specification, divalent linking substituents are described. Where the structure clearly requires a linking group, the Markush variables listed for that group are understood to be linking groups.

The term "n-membered" where n is an integer typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring, and 1,2,3,4-tetrahydro-naphthalene is an example of a 10-membered cycloalkyl group.

As used herein, the phrase "optionally substituted" means unsubstituted or substituted.

As used herein, the term "substituted" means that a hydrogen atom is removed and replaced by a substituent. It is to be understood that substitution at a given atom is limited by valency.

Throughout the definitions, the term "$C_{n-m}$" indicates a range which includes the endpoints, wherein n and m are integers and indicate the number of carbons. Examples include $C_{1-4}$, $C_{1-6}$, and the like.

As used herein, the term "$C_{n-m}$ alkyl", employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like. In some embodiments, the alkyl group contains from 1 to 6 carbon atoms, from 1 to 4 carbon atoms, from 1 to 3 carbon atoms, or 1 to 2 carbon atoms. In other embodiments, the alkyl group contains from 12 to 32 carbon atoms, from 12 to 28 carbon atoms, from 12 to 24 carbon atoms, or 14 to 24 carbon atoms. In certain embodiments where the alkyl group contains at least 12 carbon atoms, the alkyl group can comprise an even number of carbon atoms (e.g., 12 carbon atoms, 14 carbon atoms, 16 carbon atoms, 18 carbon atoms, 20 carbon atoms, 22 carbon atoms, 24 carbon atoms, 26 carbon atoms, 28 carbon atoms, 30 carbon atoms, or 32 carbon atoms). Alkyl substituents may be unsubstituted or substituted with one or more chemical moieties. The alkyl group can be substituted with one or more groups including, but not limited to, hydroxy, halogen, acyl, alkyl, alkoxy, alkenyl, alkynyl, aryl, heteroaryl, acyl, aldehyde, amino, ester, ether, or ketone as described below, provided that the substituents are sterically compatible and the rules of chemical bonding and strain energy are satisfied.

As used herein, "$C_{n-m}$ alkenyl" refers to an alkyl group having one or more double carbon-carbon bonds and having n to m carbons. Example alkenyl groups include, but are not limited to, ethenyl, n-propenyl, isopropenyl, n-butenyl, sec-butenyl, and the like. In some embodiments, the alkenyl moiety contains 2 to 6, 2 to 4, or 2 to 3 carbon atoms. In other embodiments, the alkenyl group contains from 12 to 32 carbon atoms, from 12 to 28 carbon atoms, from 12 to 24 carbon atoms, or 14 to 24 carbon atoms. In certain embodiments where the alkenyl group contains at least 12 carbon atoms, the alkenyl group can comprise an even number of carbon atoms (e.g., 12 carbon atoms, 14 carbon atoms, 16 carbon atoms, 18 carbon atoms, 20 carbon atoms, 22 carbon atoms, 24 carbon atoms, 26 carbon atoms, 28 carbon atoms, 30 carbon atoms, or 32 carbon atoms). Alkenyl substituents may be unsubstituted or substituted with one or more chemical moieties. The alkenyl group can be substituted with one or more groups including, but not limited to, hydroxy, halogen, acyl, alkyl, alkoxy, alkenyl, alkynyl, aryl, heteroaryl, acyl, aldehyde, amino, ester, ether, or ketone as described below, provided that the substituents are sterically compatible and the rules of chemical bonding and strain energy are satisfied.

As used herein, "$C_{n-m}$ alkynyl" refers to an alkyl group having one or more triple carbon-carbon bonds and having n to m carbons. Example alkynyl groups include, but are not limited to, ethynyl, propyn-1-yl, propyn-2-yl, and the like. In some embodiments, the alkynyl moiety contains 2 to 6, 2 to 4, or 2 to 3 carbon atoms.

As used herein, the term "$C_{n-m}$ alkoxy", employed alone or in combination with other terms, refers to a group of formula —O-alkyl, wherein the alkyl group has n to m carbons. Example alkoxy groups include methoxy, ethoxy, propoxy (e.g., n-propoxy and isopropoxy), tert-butoxy, and the like. In some embodiments, the alkyl group has 1 to 6, 1 to 4, or 1 to 3 carbon atoms.

The term "heteroalkyl," by itself or in combination with another term, means, unless otherwise stated, a stable straight or branched chain or combinations thereof, consisting of at least one carbon atom and at least one heteroatom selected from the group consisting of O, N, P, Si and S, and wherein the nitrogen and sulfur atoms may optionally be oxidized, and the nitrogen heteroatom may optionally be quaternized. The heteroatom(s) 0, N, P and S and Si may be placed at any interior position of the heteroalkyl group or at the position at which the alkyl group is attached to the remainder of the molecule. Examples include, but are not limited to, $—CH_2—CH_2—O—CH_3$, $—CH_2—CH_2—NH—CH_3$, $—CH_2—CH_2—N(CH_3)—CH_3$, $CH_2—S—CH_2—CH_3$, $—CH_2—CH_2$, $—S(O)—CH_3$, $—CH_2—CH_2—S(O)_2—CH_3$, $CH{=}CH—O—CH_3$, $—Si(CH_3)_3$, $—CH_2—CH{=}N—OCH_3$, $—CH{=}CH—N(CH_3)—CH_3$, $O—CH_3$, $—O—CH_2—CH_3$, and —CN. Up to two heteroatoms may be consecutive, such as, for example, $—CH_2—NH—OCH_3$. Similarly, the term "heteroalkylene" by itself or as part of another substituent means a divalent radical derived from heteroalkyl, as exemplified, but not limited by, $—CH_2—CH_2—S—CH_2—CH_2—$ and $—CH_2—S—CH_2—CH_2—NH—CH_2—$. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula $—C(O)_2R'—$ represents both $—C(O)_2R'—$ and $—R'C(O)_2—$. In some embodiments, heteroalkyl groups can include from 1 to 4 heteroatoms.

As used herein, the terms "halo" and "halogen" are used interchangeably and refer to F, Cl, Br, or I. In some embodiments, a halo is F, Cl, or Br. In some embodiments, a halo is F or Cl.

As used herein, "$C_{n-m}$ haloalkoxy" refers to a group of formula —O-haloalkyl having n to m carbon atoms. An example haloalkoxy group is $OCF_3$. In some embodiments, the haloalkoxy group is fluorinated only. In some embodiments, the alkyl group has 1 to 6, 1 to 4, or 1 to 3 carbon atoms.

As used herein, the term "$C_{n-m}$ haloalkyl", employed alone or in combination with other terms, refers to an alkyl group having from one halogen atom to 2s+1 halogen atoms which may be the same or different, where "s" is the number of carbon atoms in the alkyl group, wherein the alkyl group has n to m carbon atoms. In some embodiments, the haloalkyl group is fluorinated only. In some embodiments, the alkyl group has 1 to 6, 1 to 4, or 1 to 3 carbon atoms.

Drag Reducing Agents

Provided herein are drag reducing agents. The drag reducing agents can comprise a cationic surfactant and an aromatic counterion. The cationic surfactant can be defined by the formula below $$Z—R^1$$

wherein Z represents a positively charged headgroup chosen from a pyridinium headgroup and a quaternary ammonium headgroup; and $R^1$ represents a $C_{12-32}$ alkyl group, a $C_{12-32}$ heteroalkyl group, a $C_{12-32}$ alkenyl group, or a $C_{12-32}$ heteroalkenyl group. The aromatic counterion can be defined by one of Formula IIA-Formula IID below Formula IIA

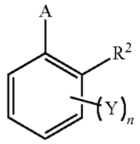

Formula IIB

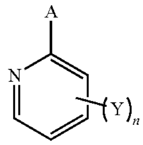

Formula IIC

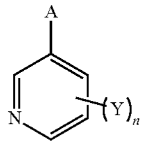

Formula IID

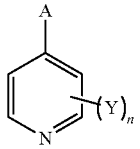

wherein A represents an anionic substituent; $R^2$ represents Y, hydrogen, or hydroxy; Y represents a hydrophobic substituent; and n is 1, 2, 3, or 4.

In some embodiments, A can comprise a carboxylate group, a sulfate group, a sulfonate group, or a phosphate group. Where valence permits, these moieties can be attached directly to the aromatic ring. In other cases, these moieties can be bound to the ring via any suitable organic substituent which can connet the anionic functional group to the aromatic ring system. For example, the anionic moitety can be bound to a $C_{1-4}$ alkyl group or a $C_{1-4}$ alkoxy group that is bound to the aromatic ring system.

In certain embodiments, the aromatic counterion can comprise a benzoic acid derivative (e.g., benzoic acid substituted with from 1-5 hydrophobic substituents). In certain embodiments, the aromatic counterion can comprise a 2-pyridinecarboxylic acid derivative (e.g., 2-pyridinecarboxylic acid substituted with from 1-5 hydrophobic substituents). In certain embodiments, the aromatic counterion can comprise a 3-pyridinecarboxylic acid derivative (e.g., 3-pyridinecarboxylic acid substituted with from 1-5 hydrophobic substituents). In certain embodiments, the aromatic counterion can comprise a 4-pyridinecarboxylic acid derivative (e.g., 4-pyridinecarboxylic acid substituted with from 1-5 hydrophobic substituents In some embodiments, the aromatic counterion is defined by the formula below

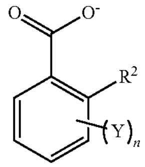

wherein $R^2$ represents Y, hydrogen, or hydroxy; Y represents a hydrophobic substituent; and n is 1, 2, 3, or 4.

In certain embodiments above, n is 1 or 2.

The hydrophobic substituents can comprise any suitable substituents that decrease the solubility of the aromatic counterion in water as compared to an otherwise identical compound lacking the hydrophobic substituents. In some embodiments, Y can represent, individually for each occurrence, halogen, $C_{1-4}$ alkyl, $C_{2-4}$ alkenyl, $C_{2-4}$ alkynyl, $C_{1-4}$ haloalkyl, $C_{1-4}$ alkoxy, or $C_{1-4}$ haloalkoxy. In certain embodiments, Y can represent, individually for each occurrence, halogen, $C_{1-4}$ alkyl, or $C_{1-4}$ haloalkyl.

Examples of aromatic counterions comprise, for example, n-chlorobenzoic acids (e.g., 2-chlorobenzoic acid, 3-chlorobenzoic acid, 4-chlorobenzoic acid, or any combination thereof).

The aromatic counterion can be present in an effective amount to decrease the critical micelle concentration of the cationic surfactant by at least 5% (e.g., at least 10%, at least 25%, at least 50%, at least 75%, at least 100%, or more).

In some embodiments, the aromatic counterion and the cationic surfactant can be present in a molar ratio (aromatic counterion:cationic surfactant) of at least 0.25:1 (e.g., at least 0.5:1, at least 0.75:1, at least 1:1, at least 1.25:1, at least 1.5:1, at least 1.75:1, at least 2:1, at least 2.25:1, at least 2.5:1, at least 2.75:1, at least 3:1, at least 3.5:1, at least 4:1, or at least 4.5:1). In some embodiments, the aromatic counterion and the cationic surfactant can be present in a molar ratio (aromatic counterion:cationic surfactant) of 5:1 or less (e.g., 4.5:1 or less, 4:1 or less, 3.5:1 or less, 3:1 or less, 2.75:1 or less, 2.5:1 or less, 2.25:1 or less, 2:1 or less, 1.75:1 or less, 1.5:1 or less, 1.25:1 or less, 1:1 or less, 0.75:1 or less, or 0.5:1 or less).

The aromatic counterion and the cationic surfactant can be present in a molar ratio (aromatic counterion:cationic surfactant) ranging from any of the minimum values described above to any of the maximum values described above. For example, in some embodiments, the aromatic counterion and the cationic surfactant can be present in a molar ratio (aromatic counterion:cationic surfactant) of from 0.25:1 to 5:1 (e.g., from 0.5:1 to 2:1).

In some embodiments, the cationic surfactant can comprise a quaternary ammonium surfactant. For example, in some embodiments, the cationic surfactant can be defined by Formula IA Formula IA

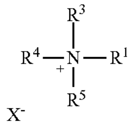

wherein $R^1$ represents a $C_{12-32}$ alkyl group, a $C_{12-32}$ heteroalkyl group, a $C_{12-32}$ alkenyl group, or a $C_{12-32}$ heteroalkenyl group; $R^3$, $R^4$, and $R^5$ each independently represent a $C_{1-12}$ alkyl group, a $C_{1-12}$ heteroalkyl group, a $C_{1-12}$ alkenyl group, or a $C_{1-12}$ heteroalkenyl group; and $X^{(-)}$ represents a monovalent anion, such as $F^{(-)}$, $Cl^{(-)}$, $Br^{(-)}$, $I^{(-)}$, $NO_3^{(-)}$, $SO_3H^{(-)}$, $SO_4H^{(-)}$, $CH_3COO^{(-)}$ (acetate), $CH_3SO_3^{(-)}$ (methane sulfonate), $CF_3SO_3^{(-)}$ (fluoromethane sulfonate), $CH_3OSO_3^{(-)}$ (methanesulfate), HO—$CH_2COO^{(-)}$ (glycolate), or HO—$CH(CH_3)COO^{(-)}$(lactate). For example, in some cases, the cationic surfactant can comprise cetrimonium chloride, cetrimonium bromide, stearyltrimethylammonium chloride, stearyltrimethylammonium bromide, tallowtrimonium chloride, tallowtrimonium bromide, aurtrimonium chloride, aurtrimonium bromide, cocoyl trimethylammonium chloride, cocoyl trimethylammonium bromide, N,N-Bis(2-hydroxyethyl)-N-methyloctadecanaminium chloride, N,N-Bis(2-hydroxyethyl)-N-methyloctadecanaminium bromide, Methyl bis(2-hydroxyethyl)cocammonium chloride, Methyl bis(2-hydroxyethyl)cocammonium bromide, erucyl bis(2-hydroxyethyl)methyl ammonium chloride, erucyl bis(2-hydroxyethyl)methyl ammonium bromide, or any combination thereof.

In some embodiments, the cationic surfactant can be defined by Formula IB

Formula IB

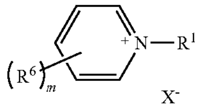

Wherein $R^1$ represents a $C_{12-32}$ alkyl group, a $C_{12-32}$ heteroalkyl group, a $C_{12-32}$ alkenyl group, or a $C_{12-32}$ heteroalkenyl group; $R^6$ represents, individually for each occurrence, $C_{1-4}$ alkyl; m (which defines the number of $R^6$ groups present on the pyridinium ring) is 0, 1, 2, or 3; and $X^{(-)}$ represents a monovalent anion, such as $F^{(-)}$, $Cl^{(-)}$, $Br^{(-)}$, $I^{(-)}$, $NO_3^{(-)}$, $SO_3H^{(-)}$, $SO_4H^{(-)}$, $CH_3COO^{(-)}$ (acetate), $CH_3SO_3^{(-)}$ (methane sulfonate), $CF_3SO_3^{(-)}$(fluoromethane sulfonate), $CH_3OSO_3^{(-)}$ (methanesulfate), HO—$CH_2COO^{(-)}$ (glycolate), or HO—$CH(CH_3)COO^{(-)}$(lactate). For example, in some cases, the cationic surfactant can comprise cetylpyridinium chloride, cetylpyridinium bromide, or any combination thereof.

Examples of suitable aromatic counterions include the compounds shown below (or salts or protonated forms thereof.

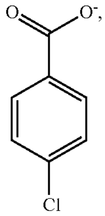 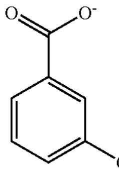 , 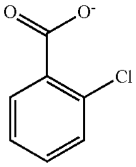 ,

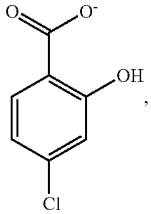 , 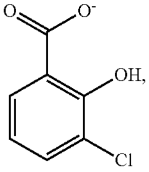 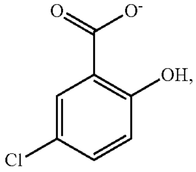

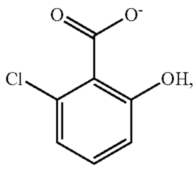 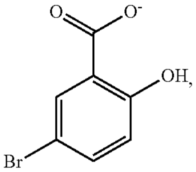

-continued

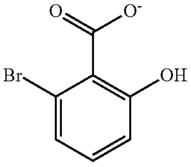 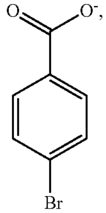 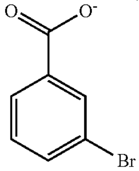 ,

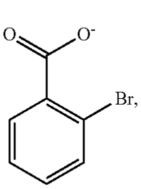 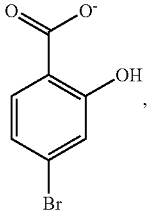 , 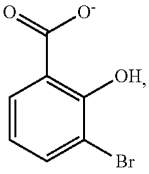

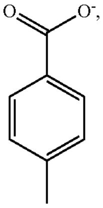 , 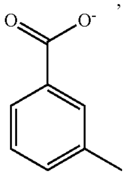 , 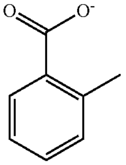

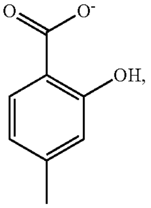 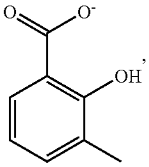 , 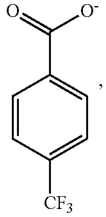 ,

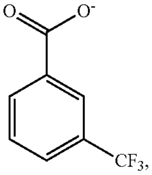 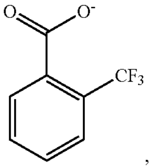 , 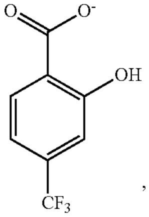 ,

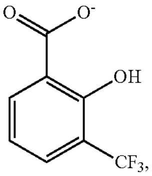 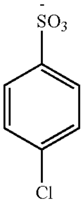 , 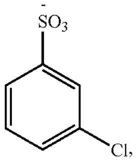

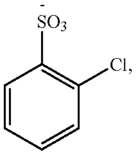 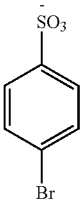 , 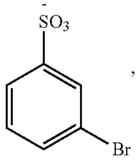 ,

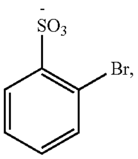 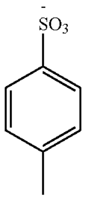 , 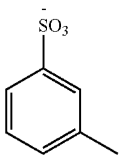 ,

-continued

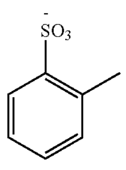

,

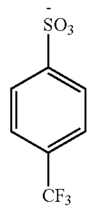

,

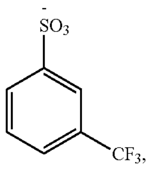

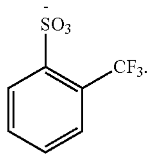

Compositions and Methods of Use

Also provided are aqueous composition comprising water and a drag reducing agent described herein.

In some embodiments, the drag reducing agent can be present in the aqueous composition in an amount of 5.0% by weight or less (e.g., 4.5% by weight or less, 4.0% by weight or less, 3.5% by weight or less, 3.0% by weight or less, 2.5% by weight or less, 2.0% by weight or less, 1.5% by weight or less, 1.0% by weight or less, 0.5% by weight or less, 0.1% by weight or less, 0.05% by weight or less, 0.01% by weight or less, or 0.005% by weight or less), based on the total weight of the aqueous composition. In some embodiments, the drag reducing agent can be present in the aqueous composition in an amount of at least 0.001% by weight (e.g., at least 0.005% by weight, at least 0.01% by weight, at least 0.05% by weight, at least 0.1% by weight, at least 0.5% by weight, at least 1.0% by weight, at least 1.5% by weight, at least 2.0% by weight, at least 2.5% by weight, at least 3.0% by weight, at least 3.5% by weight, at least 4.0% by weight, or at least 4.5% by weight), based on the total weight of the aqueous composition.

The drag reducing agent can be present in the aqueous composition in an amount ranging from any of the minimum values described above to any of the maximum values described above. For example, in some embodiments, the drag reducing agent can be present in the aqueous composition in an amount of from 0.001% by weight to 0.1% by weight, or from 0.1% by weight to 2.5% by weight, based on the total weight of the aqueous composition.

For example, in some embodiments, the drag reducing agent can be present in the aqueous composition in an amount of from 0.001% by weight to 0.1% by weight, based on the total weight of the aqueous composition.

In some embodiments, the cationic surfactant and the anionic counterion self-assemble to form thread-like micelles. Surfactants with the ability to form extremely long, cylindrical micelles are of interest as drag-reducing additives for systems with circulating water, especially those destined for heat or cold distribution.

In such applications, one desires to maintain a laminar flow in the conduits while at the same time to have turbulence in the heat exchangers to achieve therein a high heat transfer per unit area. Fibers and chain polymers are unable to provide this double function which, however, can be achieved with thread-like micelles, since the micelles, which are responsible for the drag reduction, can be destructed by mechanical devices either within the heat exchangers or immediately before them. Thus, a turbulent flow can be created within the heat exchangers. In the tube after the exchanger the micelles will form again rather rapidly and the drag reduction will thus be restored.

The thread-like micelles are disordered at low Reynolds numbers (below $10^4$), causing no or only a very slight decrease in the flow resistance, or even causing an increase in the flow resistance. At higher Reynolds numbers (above $10^4$), the micelles can become aligned, resulting in a drag reduction very close to that which is theoretically possible. At even higher Reynolds numbers (e.g. above $10^5$) the shear forces in the liquid become so high that the micelles start to get torn and the drag-reducing effect decreases as the Reynolds number increases above this value.

The range of Reynolds numbers within which the drag reducing agents have a significant drag-reducing effect is dependent on the concentration, the range increasing with the concentration. By selecting the right concentration of drag reducing agents and suitable flow rates in conduits and adequate devices before or in the heat exchangers, it is thus possible to establish a laminar flow in the conduits and turbulence in the heat exchangers. Thus, the dimensions of the conduits can be kept at a low level and the pump size, or the number of pump stations, and consequently the pump work, can alternatively be reduced while retaining the same tubular dimensions.

Thread-like micelles can be characterized in terms of their aspect ratio. "Aspect ratio," as used herein, refers to the length divided by the diameter of the thread-like micelle. In some cases, the cationic surfactant and the anionic counterion self-assemble to form thread-like micelles having an aspect ratio of at least 10:1 (e.g., at least 50:1, at least 100:1, at least 250:1, at least 500:1, at least 1,000:1, at least 5,000:1, at least 10,000:1, or more).

In some embodiments, the aqueous composition can further comprise a pH adjusting agent (e.g., an acid, a base, or a combination thereof). In certain embodiments, the composition can have a pH of from 7 to 11, such as a pH of from 7 to 10. In some embodiments, the aqueous composition further comprises one or more additives, such as a biocide, an antifreeze agent, a corrosion inhibitor, an anti-scaling agent, or a combination thereof. In some embodiments, the compositions can further comprise a co-solvent.

The compositions can exhibit switchable turbulent drag reduction. For example, in some embodiments, the composition can exhibit one or more of the following in response to a change in stimulus, environment, or composition: (a) drag reduction percent, heat transfer reduction percent, or a combination thereof are reduced by at least 10 percentage points by a temperature change of less than or equal to 5° C.; (b) drag reduction percent, heat transfer reduction percent, or a combination thereof are reduced by at least 10 percentage points by a temperature change of less than or equal to 5° C. at temperatures between 0° C. and 20° C.; (c) drag reduction percent, heat transfer reduction percent, or a combination thereof are reduced by at least 10 percentage points by a temperature change of less than or equal to 5° C. at temperatures between 0° C. and 15° C.; (d) drag reduction percent, heat transfer reduction percent, or a combination thereof are reduced by at least 10 percentage points by a temperature change of less than or equal to 5° C. at temperatures between 40° C. and 60° C.; (e) drag reduction percent, heat transfer reduction percent, or a combination thereof are reduced by at least 10 percentage points by a temperature change of less than or equal to 5° C. at temperatures between 40° C. and 70° C.; (f) drag reduction percent, heat transfer reduction percent, or a combination thereof are reduced by at least 10 percentage points by a change in flow rate of less than or equal to 10%; (g) drag reduction percent, heat transfer reduction percent, or a combination thereof are reduced by at least 10 percentage points by a change in flow rate of less than or equal to 20%; (h) drag reduction percent, heat transfer reduction percent, or a combination thereof are reduced by at least 10 percentage points by a change in pipe diameter of less than or equal to 20%; (i) drag reduction percent, heat transfer reduction percent, or a combination thereof are reduced by at least 10 percentage points by a change in pipe diameter of less than or equal to 30%; (j) drag reduction percent, heat transfer reduction percent, or a combination thereof are reduced by at least 10 percentage points by a change in pipe diameter of less than or equal to 40%; (k) drag reduction percent, heat transfer reduction percent, or a combination thereof are reduced by at least 10 percentage points by a change in pipe diameter of less than or equal to 50%; (l) drag reduction percent, heat transfer reduction percent, or a combination thereof are reduced by at least 10 percentage points by a change in concentration of less than or equal to 1%; (m) drag reduction percent, heat transfer reduction percent, or a combination thereof are reduced by at least 10 percentage points by a change in concentration of less than or equal to 10%; (n) drag reduction percent, heat transfer reduction percent, or a combination thereof are reduced by at least 10 percentage points by a change in concentration of less than or equal to 25%; or any combination thereof.

Also provided are methods of reducing the frictional energy losses associated with the flow of an aqueous fluid along a surface (e.g., the interior surface of a pipe or tube). These methods can comprise adding a drag reducing agent described herein to the aqueous fluid. The aqueous fluid can comprise, for example, a heating medium in a heat transport system, a heating medium in a recirculating heat transport system, a heating medium in an HVAC system, a heating medium in a recirculating HVAC system, a cooling medium in a heat transport system, a cooling medium in a recirculating heat transport system, a cooling medium in an HVAC system, a cooling medium in a recirculating HVAC system, an aqueous fluid injected in an oil and gas operation, or any combination thereof.

EXAMPLES

The invention will be described in greater detail by way of specific examples. The following examples are offered for illustrative purposes, and are not intended to limit the invention in any manner. Those of skill in the art will readily recognize a variety of non-critical parameters which can be changed or modified to yield essentially the same results.

Example 1: A Surfactant Solution with Switchable Turbulent Drag Reduction Behavior for Heat Transfer Enhancement or Deactivation of Drag Reducing Ability

Background

Drag Reduction. As liquid flows through a tube, the pressure within the tube decreases along its length due to the wall shear stress, the force exerted on the liquid by the tube wall in the direction opposite of the flow. At sufficiently high flow rates, this friction drag produces turbulence, which is characterized by semi-chaotic flow, thorough mixing, and vorticity. Turbulent drag reduction (DR) is a large decrease in the friction pressure loss caused by the introduction of small amounts of chemical additives. Different classes of additives have been investigated for their DR ability including high molecular weight polymers, aluminum soaps, surfactants, and fibers.

DR is quantified as DR %, which is the percent reduction of the friction factor relative to the pure solvent at the same volumetric flow rate and temperature (as shown in Equation 1 below):

$$DR\ \% = \frac{f_{solvent} - f}{f_{solvent}} \times 100\% \quad (1)$$

where $f_{solvent}$ is the friction factor of the solvent, and f is the friction factor of the DR fluid at the same conditions. DR % generally increases with increasing solvent Reynolds number and can approach 90% in surfactant solutions.

Heat Transfer Reduction. DR flows typically exhibit much lower convective heat transfer (HT) coefficients, so HT in DR solutions is generally poor. This is caused by a reduction in radial turbulence intensities of up to 80%, a laminar-like thermal boundary layer, a thickened sublayer, and possibly shear-induced thickening or the presence of a gel phase at the wall.

This reduction of HT coefficients is called heat transfer reduction (HTR). HTR is quantified as HTR %, the percent reduction of the Nusselt number relative to the pure solvent at the same volumetric flow rate and average temperature (as shown in Equation 2 below):

$$HTR\ \% = \frac{Nu_{solvent} - Nu}{Nu_{solvent}} \times 100\% \quad (2)$$

where $Nu_{solvent}$ is the Nusselt number of the pure solvent, and Nu is the Nusselt number of the DR fluid at the same flow conditions. Research has shown that in fully developed tube flow the HTR % is always higher than the DR %, and HTR can exceed 90%.

Direct Heating and Cooling Systems. One potential commercial application of DR solutions is in district heating and cooling (DHC) systems. DHC systems are an energy-efficient way to heat and cool buildings. District heating is commonly used in many places in the world, especially in Northern and Eastern Europe, and district cooling is widely used in Japan. In these systems, water is heated or cooled at a central plant and pumped through underground pipes to nearby commercial, industrial, and/or residential buildings. A heat exchanger inside each building is used to transfer heat to or from the stream in order to heat or cool the building using another circulating system in conjunction with radiators or fan coil units. The water is then returned to the central plant to be heated or cooled again. These systems are more energy and cost efficient than having individual air conditioners or furnaces in every building, and they have lower space and maintenance requirements. Also, they can utilize waste heat from power plants, biomass facilities, and other sources of industrial low-grade heat.

A number of trials of DR additives in DHC systems have been reported. The most noteworthy district heating tests have been carried out in Denmark in the cities of Copenhagen and Herning. It was reported in 1998 that the estimated pumping energy reduction for the Copenhagen system was 28% (equivalent to 16 GWh annually), and the reduced pumping energy combined with the reallocation of energy production enabled by the DR additive was expected to result in 1,500 terrajoules of fuel savings and reduce $CO_2$ emissions by 208,000 ton per year. The estimated pumping energy reduction for the Herning system was estimated at a minimum of 1371 MWh per year and a best case of 4147 MWh per year.

Various tests took place in a 2.8 kilometer-long section of the 40 km Herning system between the years 1985 and 2000. In the final report of the Herning tests, it was reported that 72% DR was achieved with 552 ppm of a surfactant additive. Unfortunately a large HTR effect was also observed, rendering the existing heat exchangers inadequate. As a direct result of HTR problem, the use of DR additives in Herning was abandoned in March 2000.

Overview of DR Compositions

Described in this example is an aqueous solution that includes a surfactant and an aromatic, hydrotropic counterion with one or more hydrophobic substitutions on its benzene ring. The compositions can exhibit a sharp dependence of the solution's drag reducing ability on temperature, solvent Reynolds number, and/or composition.

For example, solutions containing a C16 quaternary ammonium surfactant together with a hydrophobically-substituted hydrotrope have been found to produce such behavior. An example solution included 5 millimolar hexadecyltrimethyl ammonium chloride and 5 millimolar 3-chlorobenzoic acid in water. The structures of hexadecyltrimethyl ammonium chloride and 3-chlorobenzoic acid are shown below.

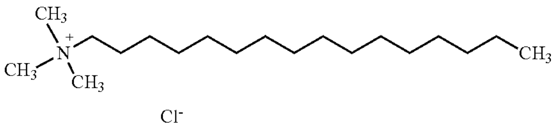

Hexadecyltrimethyl Ammonium Chloride

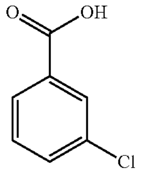

3-Chlorobenzoic Acid

These formulations can transition from effective DR ability (>50% decrease in the friction factor compared with water) to near water-like behavior with very small changes in temperature, solvent Reynolds number, and/or composition (surfactant concentration, counterion concentration, or their ratio).

Need for Heat Transfer Enhancement in DR Solutions. To successfully capitalize on the pumping energy savings in systems like the one in Herning, the heat transfer ability of the DR solution must be enhanced. To date, heat transfer enhancement studies in turbulent drag reducing surfactant solutions have focused primarily on the use of devices inserted into a pipe. Such methods are energy-intensive, due to the pressure drop produced by the devices. For this reason, techniques for chemically deactivating DR ability (e.g., developing "switchable" DR solutions) are of interest.

Methods have been identified to chemically control the physical properties of surfactant solutions. These have made use of $CO_2$, reduction/oxidation reactions, pH, light, and temperature. However, only two of these methods—light and pH-responsive surfactant systems—have been successfully applied to DR solutions. However, the use of pH-responsive solutions would require constant chemical additions, and the use of light-responsive systems would require prohibitively expensive, high-intensity light sources, so neither is practical for commercial-scale applications.

Evaluation of DR Compositions for Use in Direct Heating and Cooling Systems. Any strategy for enhancing heat transfer in DHC systems would require simultaneous high values of DR (>50%) in transmission pipelines (to achieve pumping energy savings) and low values of HTR in heat transfer equipment such as heat exchangers and chillers (for effective heat transfer). In any real-world system, there are necessarily differences in diameter, velocity, and temperature between transmission pipelines and heat transfer equipment, so the strong dependence of DR and HTR on temperature and Reynolds number (encompassing diameter and flow rate) enables DR and HTR to be "on" at the conditions in a pipeline and "off" at the conditions in a heat exchanger.

FIG. 1 shows data from an experimental demonstration of high DR in a larger diameter tube and low HTR in a smaller diameter tube simultaneously in the same system. It can be seen from this graph that operating a system in which a smaller diameter pipe was present in a chiller/heat exchanger and larger diameter pipe were present in a transmission pipeline would enhance heat transfer while achieving pumping energy savings from drag reduction.

Figure 2:
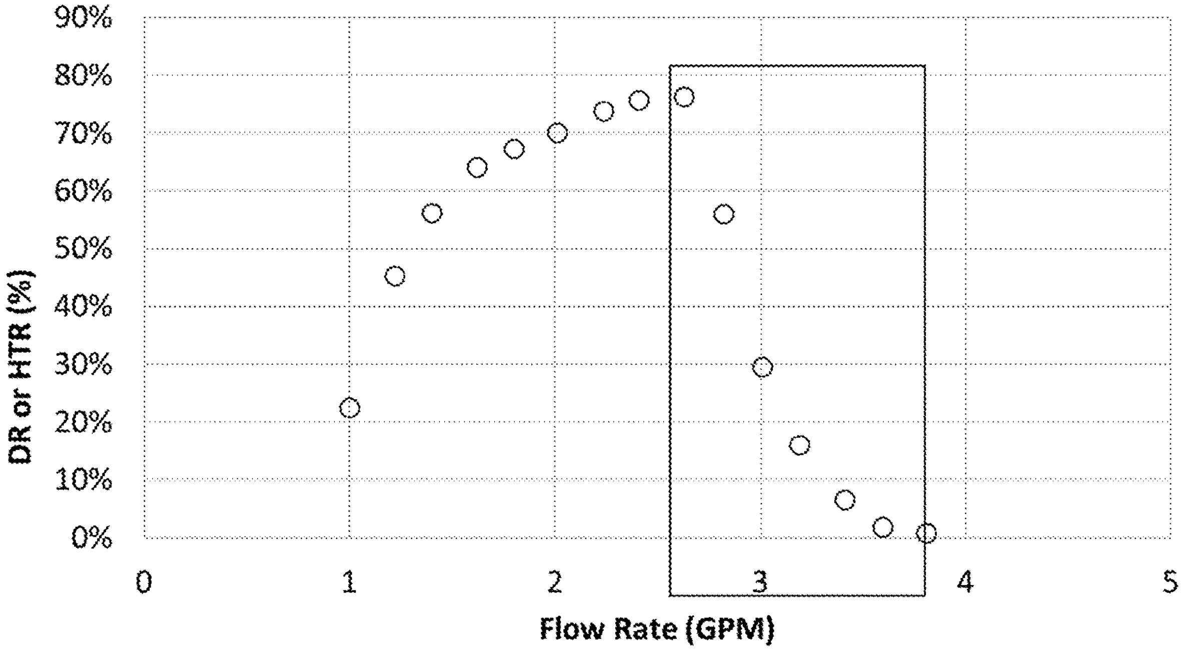
FIG. 2 is a plot showing DR for 3.75 mM hexadecyltrimethyl ammonium chloride and 3.75 mM 3-chlorobenzoic acid in water at 20.5° C.

FIG. 2 shows sudden loss of DR with increasing flow rate at the same pipe diameter. HTR is caused by DR, so it can be seen from this graph that operating a system in which a higher flow rate (linear velocity) were present in a chiller/heat exchanger and lower flow rate (linear velocity) were present in a transmission pipeline would enhance heat transfer while achieving pumping energy savings from drag reduction.

Figure 3:
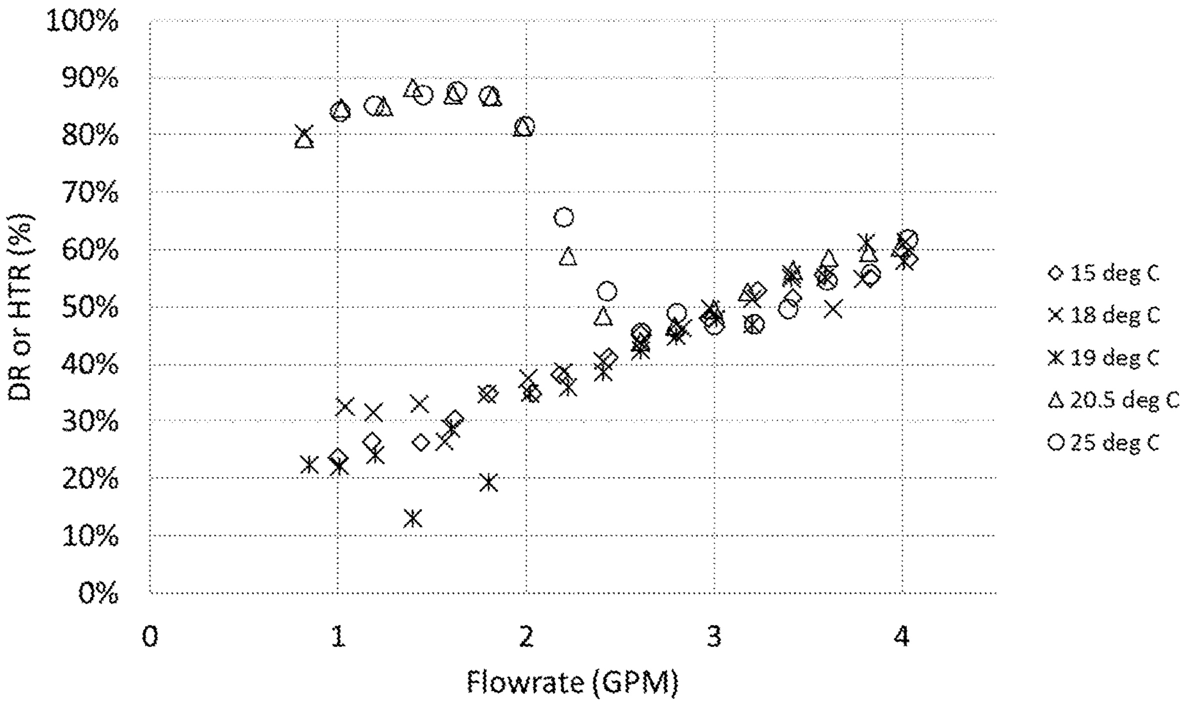
FIG. 3 is a plot showing HTR for 1.25 mM hexadecyltrimethyl ammonium chloride and 1.25 mM 3-chlorobenzoic acid in water.
Figure 4:
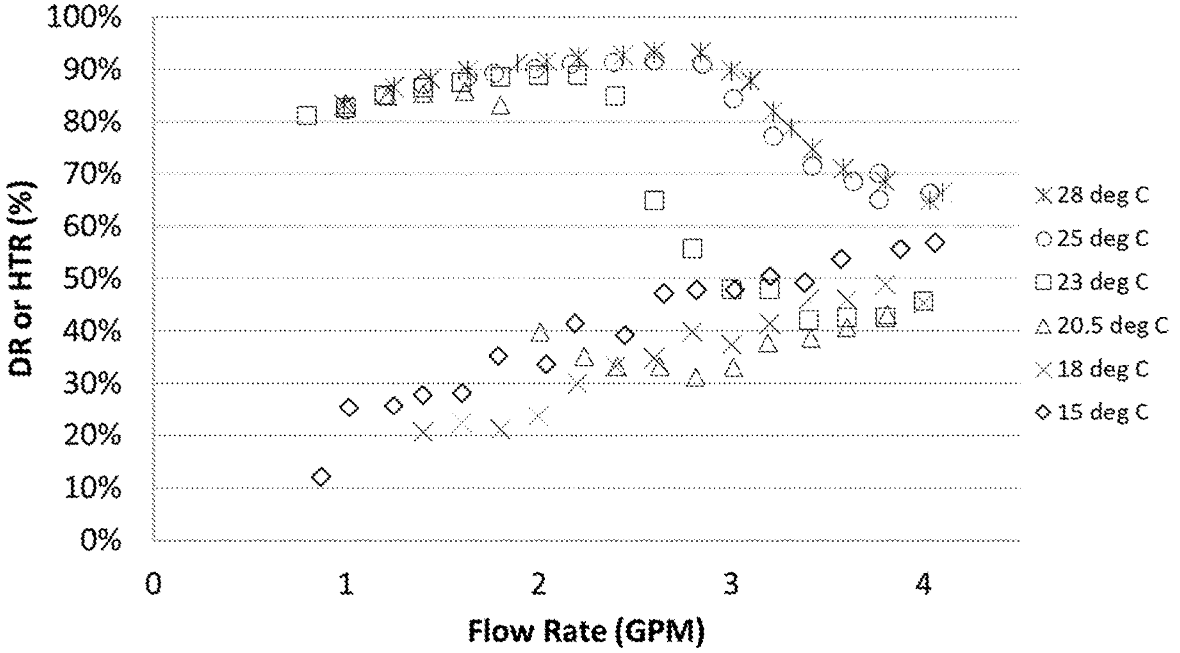
FIG. 4 is a plot showing HTR for 2.5 mM hexadecyltrimethyl ammonium chloride and 2.5 mM 3-chlorobenzoic acid in water.
Figure 5:
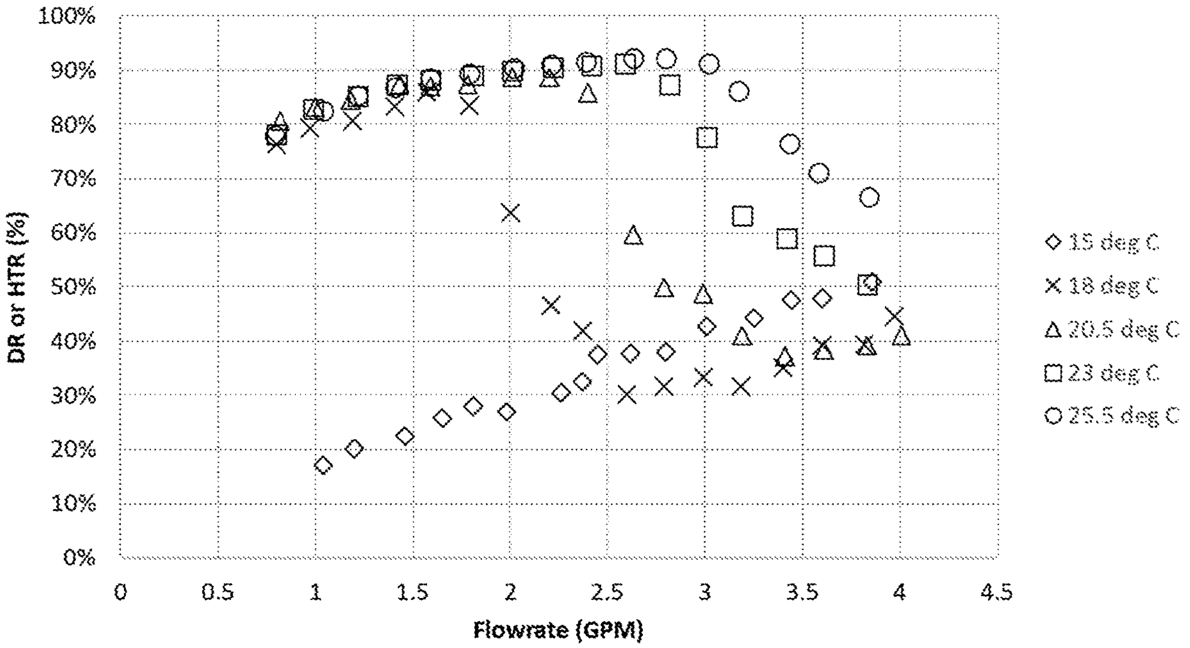
FIG. 5 is a plot showing HTR for 3.75 mM hexadecyltrimethyl ammonium chloride and 3.75 mM 3-chlorobenzoic acid in water.

FIGS. 3, 4, and 5 show loss of HTR with increasing flow rate at the same pipe diameter. It can be seen from these graphs that operating a system in which a higher flow rate (linear velocity) were present in a chiller/heat exchanger and lower flow rate (linear velocity) present in a transmission pipeline would enhance heat transfer while achieving pumping energy savings from drag reduction.

Figure 6:
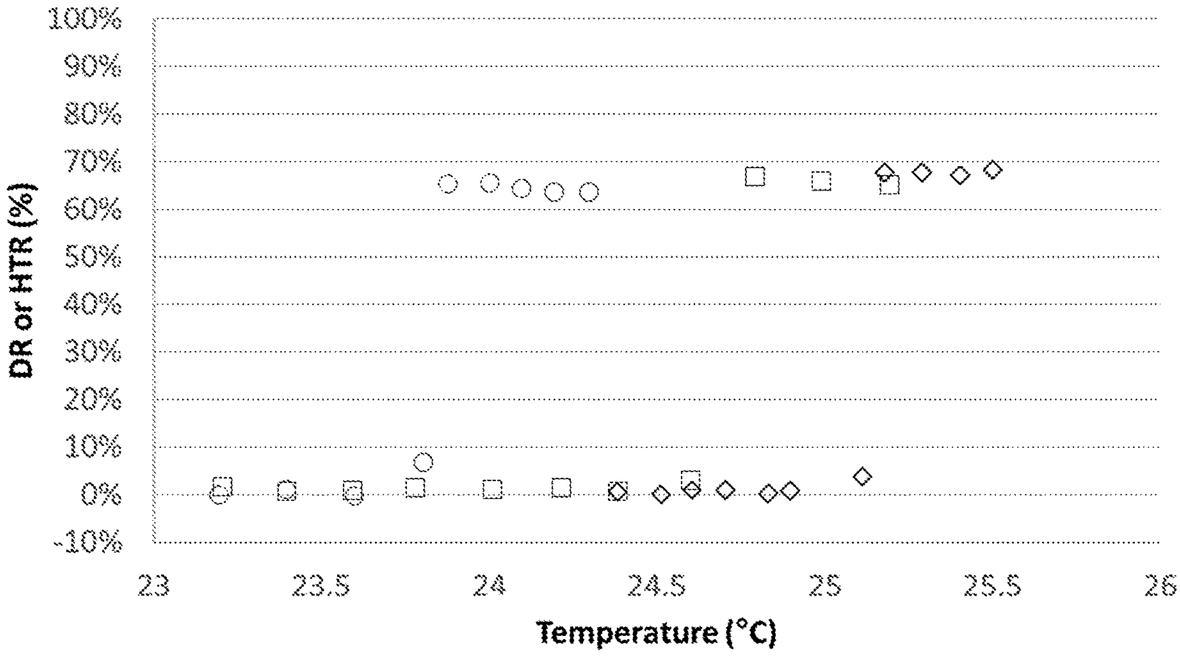
FIG. 6 is a plot showing drag reduction onset temperatures for 5 mM hexadecyltrimethyl ammonium chloride and 5 mM 3-chlorobenzoic acid in water at different Reynolds numbers (varying flow rate in same tube diameter): Re=25000 (circles), 30000 (squares), and 35000 (diamonds).

FIG. 6 shows the sudden onset of DR and HTR with increasing tem-perature at different Reynolds numbers (varying flow rate at the same tube diameter). It can be seen from this graph that operating a system in which a lower temperature were present in a heat exchanger and higher temperature were present in a transmission pipeline would enhance heat transfer while achieving pumping energy savings from drag reduction. This behavior would have practical use in district heating systems, where the inlet temperature to the heat exchangers in the central heating plant is necessarily the lowest temperature at any location in the system. FIG. 6 also shows the dependence of the onset temperature on Reynolds number (flow rate at the same diameter), so strategic selection of flow rate would allow the DR onset temperature to be tuned to the desired system temperatures.

Ability to Deactivate DR Solutions. DHC systems are essential public utilities, and the primary concern of the operators of such systems is reliability and continuity of service. The obligation to supply a consistent heating or cooling stream means that any disruption of the system's heat transfer ability could result in significant financial losses for the system operator.

If a DHC system operator were to introduce a DR additive into their system and discover that the resulting HTR decreased the heat transfer performance of the heat transfer fluid, it would be necessary to remove the additive, perhaps by dumping and replacing the entire liquid volume of the system. This would not only result in a disruption of service, it would also be costly.

Clearly, a strategy by which DR and HTR may be switched off with only small changes to the system parameters is highly desirable and would considerably mitigate the risk taken on by any prospective user. More importantly, without such a method the risk of service disruption would be too great for a utility provider to even consider adopting DR technology for pumping energy savings.

The strong dependence of DR and HTR on temperature and Reynolds number (encompassing diameter and flow rate) enable the deactivation of DR and HTR. This can provide large scale hot and cold water utility providers with a contingency plan in case of unsatisfactory heat transfer performance.

Examples of the deactivation ability include:

1. Referring to FIG. 2, it can be seen that increasing the flow rate from approximately 2.7 to 3 gpm would reduce HTR from approximately 77% to 30%, restoring effective heat transfer behavior.
2. Referring to FIG. 6, it can be seen that decreasing the temperature from 23.9° C. to 23.8° C. at a Reynolds number of 25,000 would reduce HTR from approximately 65% to 7%, restoring effective heat transfer behavior.
3. Referring to FIGS. 4 and 5, it can be seen that decreasing the concentration from 3.75 to 2.5 mM at a flow rate of approximately 1.75 gpm at a temperature of 18° C. would reduce HTR from approximately 85% to 21%, restoring effective heat transfer behavior.

Simultaneous changes in temperature, flow rate, and concentration could potentially provide even more effective deactivation of HTR to restore heat transfer performance.

The compounds, compositions, and methods of the appended claims are not limited in scope by the specific compounds, compositions, and methods described herein, which are intended as illustrations of a few aspects of the claims. Any compounds, compositions, and methods that are functionally equivalent are intended to fall within the scope of the claims. Various modifications of the compounds, compositions, and methods in addition to those shown and described herein are intended to fall within the scope of the appended claims. Further, while only certain representative compounds, components, compositions, and method steps disclosed herein are specifically described, other combinations of the compounds, components, compositions, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. An aqueous composition consisting of:

water;

optionally one or more additives selected from the group consisting of a biocide, an antifreeze agent, a corrosion inhibitor, an anti-scaling agent, or a combination thereof; and from 0.001% by weight to 5.0% by weight of a drag reducing agent comprising a cationic surfactant and an aromatic counterion, wherein the cationic surfactant defined by Formula IA Formula IA

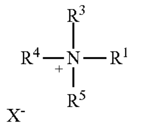

wherein $R^1$ represents a $C_{12-32}$ alkyl group, a $C_{12-32}$ heteroalkyl group, a $C_{12-32}$ alkenyl group, or a $C_{12-32}$ heteroalkenyl group;

$R^3$, $R^4$, and $R^5$ each independently represent a $C_{1-12}$ alkyl group, a $C_{1-12}$ heteroalkyl group, a $C_{1-12}$ alkenyl group, or a $C_{1-12}$ heteroalkenyl group; and wherein the aromatic counterion is defined by one of Formula IIA-Formula IID below Formula IIA

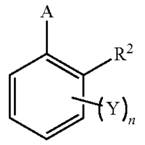

Formula IIB

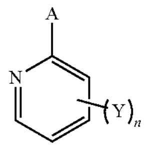

Formula IIC

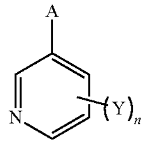

Formula IID

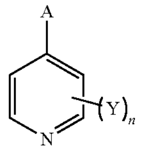

wherein

A represents an anionic substituent;

$R^2$ represents Y, hydrogen, or hydroxy;

Y represents a hydrophobic substituent; and n is 1, 2, 3, or 4.

2. The composition of claim 1, wherein A comprises a carboxylate group, a sulfate group, a sulfonate group, or a phosphate group.

3. The composition of claim 2, wherein the aromatic counterion is defined by the formula below

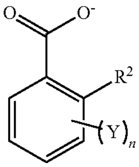

wherein $R^2$ represents Y, hydrogen, or hydroxy;

Y represents a hydrophobic substituent; and n is 1, 2, 3, or 4.

4. The composition of claim 1, wherein n is 1 or 2.

5. The composition of claim 1, wherein Y represents, individually for each occurrence, halogen, $C_{1-4}$ alkyl, $C_{2-4}$ alkenyl, $C_{2-4}$ alkynyl, $C_{1-4}$ haloalkyl, $C_{1-4}$ alkoxy, or $C_{1-4}$ haloalkoxy.

6. The composition of claim 1, wherein Y represents, individually for each occurrence, halogen, $C_{1-4}$ alkyl, or $C_{1-4}$ haloalkyl.

7. The composition of claim 1, wherein the aromatic counterion comprises one of the following:

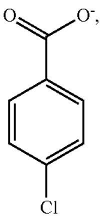
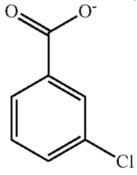
,
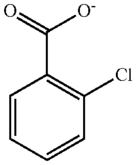
,
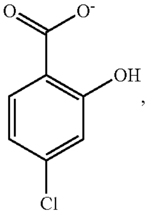
,
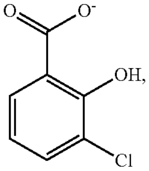
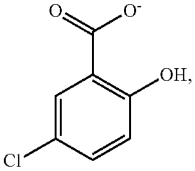
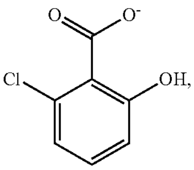
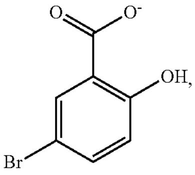
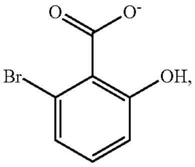
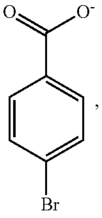
,
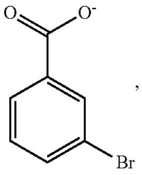
, -continued

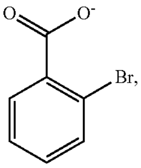
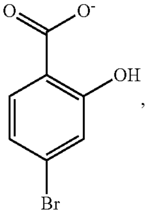
,
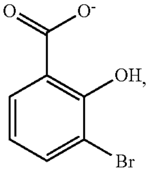
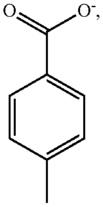
,
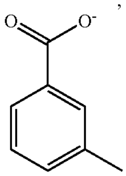
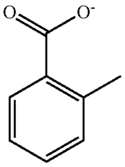
,
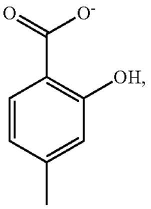
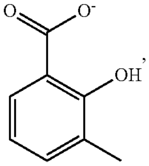
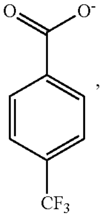
,
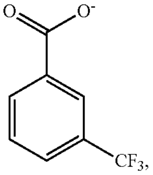
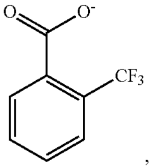
,
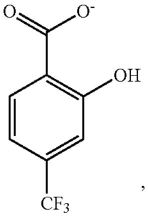
,
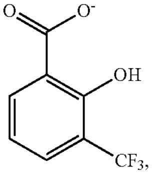
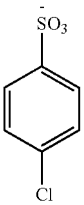
,
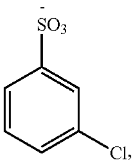
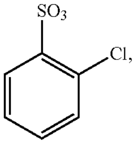
,
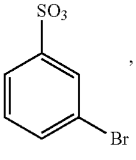
,
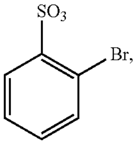
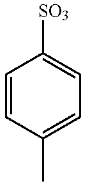
,
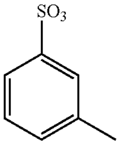
, -continued

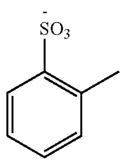

,

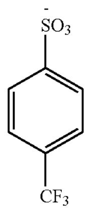

,

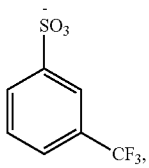

, or

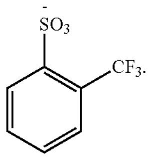

.

8. The composition of claim 1, wherein the aromatic counterion is present in an effective amount to decrease the critical micelle concentration of the cationic surfactant by at least 5%.

9. The composition of claim 1, wherein the aromatic counterion and the cationic surfactant are present in a molar ratio of from 0.5:1 to 5:1.

10. The composition of claim 1, wherein the drag reducing agent is present in the aqueous composition in an amount of from 0.001% by weight to 0.1% by weight, based on the total weight of the aqueous composition.

11. The composition of claim 1, wherein the composition has a pH of from 7 to 11.

12. The composition of claim 1, wherein the aqueous composition further comprises a biocide, an antifreeze agent, a corrosion inhibitor, an anti-scaling agent, or a combination thereof.

13. The composition of claim 1, wherein the cationic surfactant and the anionic counterion self-assemble to form thread-like micelles having an aspect ratio of at least 10:1.

14. The composition of claim 1, wherein the composition exhibits one or more of the following:

(a) drag reduction percent, heat transfer reduction percent, or a combination thereof are reduced by at least 10 percentage points by a temperature change of less than or equal to 5° C.;

(b) drag reduction percent, heat transfer reduction percent, or a combination thereof are reduced by at least 10 percentage points by a temperature change of less than or equal to 5° C. at temperatures between 0° C. and 20° C.;

(c) drag reduction percent, heat transfer reduction percent, or a combination thereof are reduced by at least 10 percentage points by a temperature change of less than or equal to 5° C. at temperatures between 0° C. and 15° C.;

(d) drag reduction percent, heat transfer reduction percent, or a combination thereof are reduced by at least 10 percentage points by a temperature change of less than or equal to 5° C. at temperatures between 40° C. and 60° C.;

(e) drag reduction percent, heat transfer reduction percent, or a combination thereof are reduced by at least 10 percentage points by a temperature change of less than or equal to 5° C. at temperatures between 40° C. and 70° C.;

(f) drag reduction percent, heat transfer reduction percent, or a combination thereof are reduced by at least 10 percentage points by a change in flow rate of less than or equal to 10%;

(g) drag reduction percent, heat transfer reduction percent, or a combination thereof are reduced by at least 10 percentage points by a change in flow rate of less than or equal to 20%;

(h) drag reduction percent, heat transfer reduction percent, or a combination thereof are reduced by at least 10 percentage points by a change in pipe diameter of less than or equal to 20%;

(i) drag reduction percent, heat transfer reduction percent, or a combination thereof are reduced by at least 10 percentage points by a change in pipe diameter of less than or equal to 30%;

(j) drag reduction percent, heat transfer reduction percent, or a combination thereof are reduced by at least 10 percentage points by a change in pipe diameter of less than or equal to 40%;

(k) drag reduction percent, heat transfer reduction percent, or a combination thereof are reduced by at least 10 percentage points by a change in pipe diameter of less than or equal to 50%;

(l) drag reduction percent, heat transfer reduction percent, or a combination thereof are reduced by at least 10 percentage points by a change in concentration of less than or equal to 1%;

(m) drag reduction percent, heat transfer reduction percent, or a combination thereof are reduced by at least 10 percentage points by a change in concentration of less than or equal to 10%;

(n) drag reduction percent, heat transfer reduction percent, or a combination thereof are reduced by at least 10 percentage points by a change in concentration of less than or equal to 25%;

(o) or any combination thereof.

* * * * *